United States Patent
Bantz et al.

(10) Patent No.: US 9,482,360 B2
(45) Date of Patent: Nov. 1, 2016

(54) MINIATURE HIGH PERFORMANCE SOLENOID VALVE

(71) Applicant: Parker-Hannifin Corporation, Cleveland, OH (US)

(72) Inventors: Daniel L Bantz, Brookline, NH (US); Nick J Difazzio, Bloomfield, NJ (US); Matthew R Kearsley, Morris Plains, NJ (US); Leonard E Prais, Pompton Lakes, NJ (US); Scott J Snyder, Morristown, NJ (US); Thomas Theilmeier; Yong Wang, Hillsdale, NJ (US); Donald S. McNeil, Brookline, NH (US)

(73) Assignee: Parker-Hannifin Corporation, Cleveland, OH (US)

( * ) Notice: Subject to any disclaimer, the term of this patent is extended or adjusted under 35 U.S.C. 154(b) by 142 days.

(21) Appl. No.: 14/330,396

(22) Filed: Jul. 14, 2014

(65) Prior Publication Data
US 2016/0010760 A1    Jan. 14, 2016

Related U.S. Application Data

(60) Provisional application No. 61/846,338, filed on Jul. 15, 2013.

(51) Int. Cl.
  *F16K 31/06*   (2006.01)
  *F16K 27/02*   (2006.01)
(52) U.S. Cl.
  CPC ............ *F16K 31/06* (2013.01); *F16K 27/029* (2013.01); *F16K 31/0655* (2013.01); *F16K 31/0675* (2013.01)
(58) Field of Classification Search
  CPC ........... F16K 31/0655; F16K 31/0675; F16K 31/06; F16K 27/029

USPC .......................... 251/129.15, 129.17, 129.19
See application file for complete search history.

(56) References Cited

U.S. PATENT DOCUMENTS

| | | | |
|---|---|---|---|
| 5,036,885 A | * | 8/1991 | Miura ................ F16K 31/0648 137/625.65 |
| 5,304,971 A | | 4/1994 | Sturman et al. |

(Continued)

FOREIGN PATENT DOCUMENTS

| | | |
|---|---|---|
| CN | 202629269 U | 12/2012 |
| DE | 202009000593 U1 | 3/2009 |

(Continued)

OTHER PUBLICATIONS

Extended European Search Report for corresponding European Patent Application No. 14176953.9-1751, dated Nov. 28, 2014.

(Continued)

*Primary Examiner* — William McCalister
*Assistant Examiner* — Ian Paquette
(74) *Attorney, Agent, or Firm* — Renner, Otto, Boisselle & Sklar, LLP

(57) ABSTRACT

A solenoid valve assembly includes an armature having a longitudinal axis and an ovular cross-section, the armature being moveable along the longitudinal axis from a first position to a second position, and a bobbin including a solenoid coil configured to electromagnetically move the armature when energized. The bobbin defines a recess also having an ovular cross section for receiving the armature and restricting lateral movement of the armature, thereby providing a linear actuation path for the armature along the longitudinal axis. A flux coupler and a flux bracket form a magnetic circuit with the bobbin to electromagnetically move the armature. The flux bracket has a pole piece with a commensurate ovular cross-section that limits the movement of the armature along the longitudinal axis, thereby determining a stroke length of the armature. During manufacture, the flux bracket, and therefore the pole piece, are moved relative to the flux coupler to set the stroke length.

16 Claims, 10 Drawing Sheets

(56) References Cited

U.S. PATENT DOCUMENTS

| | | | | |
|---|---|---|---|---|
| 5,337,785 | A * | 8/1994 | Romer | F16K 7/16 137/596.17 |
| 5,653,422 | A * | 8/1997 | Pieloth | F16K 31/0682 137/596.17 |
| 6,318,408 | B1 * | 11/2001 | Fukano | F15B 13/0405 137/625.44 |
| 6,537,505 | B1 | 3/2003 | LaBudde et al. | |
| 7,100,889 | B2 | 9/2006 | Purvines et al. | |
| 2002/0070370 | A1 * | 6/2002 | Fukano | F16K 31/0672 251/129.04 |
| 2002/0134957 | A1 * | 9/2002 | Paessler | F16K 31/0682 251/129.15 |
| 2003/0042453 | A1 * | 3/2003 | Sato | F16K 31/0655 251/129.15 |
| 2003/0102453 | A1 * | 6/2003 | Fukano | F16K 27/003 251/129.15 |
| 2003/0107018 | A1 * | 6/2003 | Hettinger | F16K 11/052 251/129.19 |
| 2004/0084649 | A1 * | 5/2004 | Yoshimura | F16K 31/0655 251/129.15 |
| 2005/0253104 | A1 | 11/2005 | Sato et al. | |
| 2006/0027269 | A1 | 2/2006 | Neff et al. | |
| 2013/0153606 | A1 | 6/2013 | Toporek | |
| 2013/0277591 | A1 * | 10/2013 | Scheibe | F16K 31/52 251/279 |

FOREIGN PATENT DOCUMENTS

| | | |
|---|---|---|
| JP | S61-142407 | 9/1986 |
| JP | 2005-163924 | 6/2005 |
| JP | 2005-32940 | 11/2005 |
| JP | 2006-049918 | 2/2006 |
| JP | 2006-253324 | 9/2006 |

OTHER PUBLICATIONS

Japanese Office Action (and English translation) for corresponding Japanese patent application No. 2014-143914 dated Jul. 30, 2015.

* cited by examiner

MINIATURE HIGH PERFORMANCE SOLENOID VALVE

RELATED APPLICATION

This application claims the benefit of U.S. Provisional Application No. 61/846,338, filed Jul. 15, 2013, which is incorporated herein by reference.

FIELD OF INVENTION

The present invention relates generally to solenoid actuator valves, and more particularly to solenoid actuator valves for use in high pressure and high flow applications, such as for example in life science applications.

BACKGROUND OF THE INVENTION

High pressure and high flow valves are used in a variety of applications. For example, clinical laboratories and hospitals utilize various diagnostic apparatuses to analyze patient medical samples, such as blood, urine, other fluids, and tissues. In such apparatuses, high pressure and high flow valves control the flow of reagents, buffer solutions, washouts, and other requisite fluid components that are used in the analytical processes. Often, the diagnostic apparatuses employ manifolds with micro wells incorporating multiple valves for controlling the flows of differing amounts and/or types of fluids. Because it is desirable for a diagnostic apparatus to be as compact as practicable, size of the valves remains a concern, but with reduced size sufficient speed and efficiency needs to be maintained.

Reduced valve size has several advantages, so long as efficient sample throughput at a reduced cost is achieved. Reduced valve size, and particularly valve width, permits an instrument configuration in which multiple valves are mounted adjacent to each other over micro wells on a common manifold to maintain a compact footprint, and to organize fluid connections efficiently. Smaller width valves allow for reduction in the manifold size, which contributes to decreasing the overall instrument size. The reduced valve size also permits reduction of the size of fluid paths, which decreases fluid use which is important when expensive reagents are employed. Systems using smaller bore tubing of the flow paths require higher system pressures to deliver the needed flow rates. Reduced system volume combined with the desire to process samples faster results in higher system pressures. From a valve perspective, this translates to a need to generate higher actuator forces while reducing width.

Solenoid valves with an electromagnetically driven actuator may be employed in high pressure and high flow applications. Higher flow and pressure capabilities typically require a larger valve actuator to develop the sealing force needed for valve operation, which poses a significant challenge in balancing size and performance. To achieve higher flow, a larger orifice is required, and consequently a larger stroke to allow full flow to develop. However, this requires more magnetic attraction force from the actuator to overcome the large air gap.

Some improvement in the magnetic attraction force that drives the actuator can be made through magnetic material selection, but the performance difference between materials that are readily available and cost effective is limited. Additional improvements in attraction force can made through increased coil power and number of wire turns, but there are diminishing returns once the soft magnetic materials have been saturated with the magnetic flux, and peak power budgets must also be considered. Increasing cross-sectional area of the flux path components allows more flux to be carried and thus increases magnetic attraction force, but this must be balanced against the desire to reduce the valve size, and the valve width in particular. Accordingly, it has proven difficult to reduce valve size while maintaining efficient performance at the requisite high flows and pressures.

SUMMARY OF THE INVENTION

A need in the art exists for an improved miniature high performance solenoid valve that overcomes one or more of the above deficiencies of conventional solenoid valves. The present invention is a solenoid valve assembly that includes an armature having a longitudinal axis, and the armature is moveable along the longitudinal axis from a first position to a second position. An electric coil electromagnetically drives the armature along the longitudinal axis from the first position to the second position when energized, and a bobbin containing the coil is positioned to restrict lateral movement of the armature. The resultant configuration provides a linear actuation path for the armature along the longitudinal axis.

To reduce the width of the armature and the resultant overall valve width, the armature has an ovular transverse cross-section, which provides for a valve of reduced width while increasing the cross-sectional area of the armature for carrying the magnetic flux as compared to conventional configurations. With an ovular configuration of the armature, valve widths of 9 mm or less may be achieved with comparable performance as significantly larger width valves (e.g., of about 16 mm).

An aspect of the invention, therefore, is a solenoid valve assembly. In exemplary embodiments, the solenoid valve assembly includes an armature having a longitudinal axis, the armature being moveable along the longitudinal axis from a first position to a second position, and a bobbin including a solenoid coil configured to electromagnetically move the armature along the longitudinal axis from the first position to the second position when energized. The armature has an ovular transverse cross section, and the ovular transverse cross section may have an aspect ratio of greater than 3:1. As exemplary aspect ratio of 3.5:1 has proven to be particularly suitable. The bobbin defines a recess also having an ovular cross section for receiving the armature and restricting lateral movement of the armature, thereby providing a linear actuation path for the armature along the longitudinal axis.

The use of an ovular cross section reduces the width of the valve assembly, which is beneficial for instrument packaging. The solenoid valve assembly may have a width in a width direction perpendicular to the longitudinal axis of the armature of 9 mm or less.

The solenoid valve assembly further may include a flux coupler and a flux bracket, wherein a magnetic circuit to electromagnetically move the armature is formed by the flux coupler, the flux bracket, and the armature. The flux bracket has a pole piece that limits the movement of the armature along the longitudinal axis, thereby determining a stroke length of the armature. The pole piece has an ovular cross section commensurate with the ovular cross section of the armature. The bobbin acts comparably to a spool onto which the solenoid coil wire may be wrapped. The energized coil generates magnetic flux through the armature and pole piece of the flux bracket, and the flux then flows through the flux bracket and coupler legs on both sides and back around in loops, jumping any small air gaps along the way, like the gap between the armature and flux coupler, and between the armature and pole piece.

The solenoid valve further includes a diaphragm, wherein when the armature moves from the first position to the second position, the diaphragm moves between a first diaphragm position and a second diaphragm position to open and close the valve. The diaphragm may be a rocker comprising a rocker insert that is over molded with a seal component.

The solenoid valve assembly further includes a cover assembly configured to provide ingress protection for electrical connections that energize the solenoid valve assembly. The cover assembly may include a connector that houses the electrical connections, and a rubber boot that stretch fits over the connector to provide a sealing fit.

Another aspect of the invention is a method of setting a stroke length of a solenoid actuator valve assembly. In exemplary embodiments, the pole piece and flux bracket have adjustability in the longitudinal axis by moving the flux bracket including the pole piece relative to the flux coupler. The position of the flux bracket is fixed once the optimal performance of the valve is achieved. The optimal valve performance corresponds to a minimum stroke length needed to achieve maximum flow through the valve.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
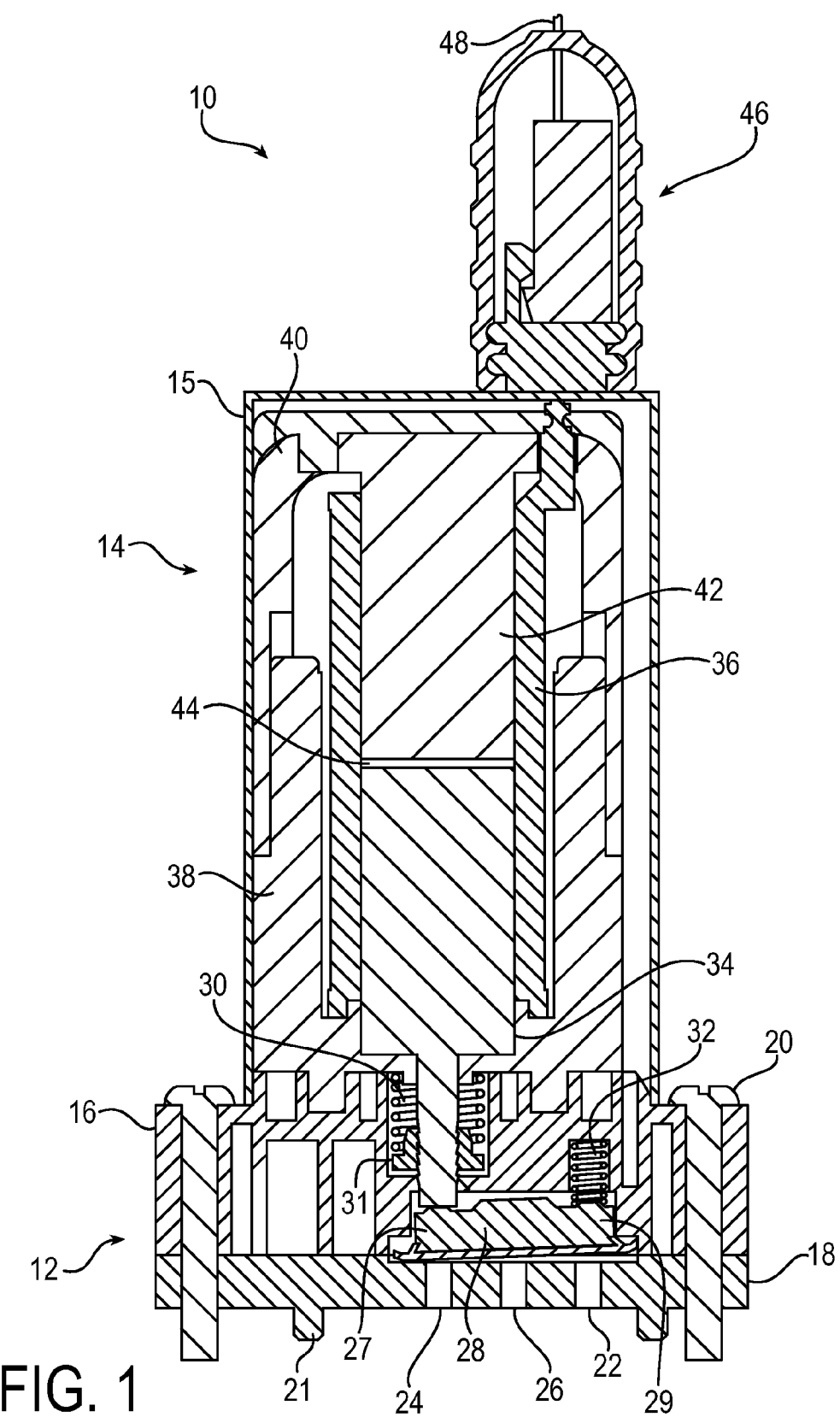
FIG. 1 is a schematic drawing depicting a cross-sectional view of an exemplary solenoid valve assembly in accordance with embodiments of the present invention.

Embodiments of the present invention will now be described with reference to the drawings, wherein like reference numerals are used to refer to like elements throughout. It will be understood that the figures are not necessarily to scale.

FIG. 1 is a schematic drawing depicting a cross-sectional view of an exemplary solenoid valve assembly 10 in accordance with embodiments of the present invention. Details of the various components are described generally with respect to FIG. 1, and more details of the various components are described with further reference to the additional figures.

The valve assembly 10 may be characterized as having a valve portion 12 and a solenoid actuator portion 14, although it will be appreciated from the description that the components of each portion operate together in the overall valve structure. The valve portion 12 may include a valve housing 16 that is secured to a valve base 18. The valve base includes a plurality of alignment pins 21 that provide for proper alignment of valve ports in the valve base with cooperating ports on a manifold. Conventional valves rely on valve mounting screws to align the valve during mounting, and the clearance between the screws and the cooperating receiving holes is typically large, which can allow excessive movement during mounts. This can lead to misalignment of the valve ports, which can result in flow restriction or flow variation problems. The configuration of the alignment pins of the present invention avoids such issues. In addition, the size and location of the alignment prevents installing the valve in the wrong orientation, (e.g., 180 degrees turned), and prevents installing a 2-way valve in the footprint of a 3-way valve (and vice versa).

The example of FIG. 1 commonly is referred to as a 3-way valve having three ports in the valve base. The valve base includes a normally open (NO) port 22, a normally closed (NC) port 24, and a common port 26. A diaphragm 28 is clamped between the valve housing 16 and valve base 18. The diaphragm 28 is moveable between a first position in which the valve is de-energized (off), and a second position in which the valve is energized (on). In connection with the type of valve depicted in FIG. 1, the diaphragm 28 also is referred to as a "rocker" 28. As its name suggests, the rocker 28 in particular "rocks" back and forth between the first and second positions, under the operation of first and second springs 30 and 32 to open and close the valve.

In the 3-way valve example of FIG. 1, the valve assembly 10 provides for a switched "ON/OFF" type valve. FIG. 1 specifically shows the valve in the OFF position. In such OFF position, the rocker 28 is in the first position in which the NO port 22 is open and the NC port 24 is closed and sealed. The NC port lacks a fluid connection and there is thus flow from the common port to the NO port. A first end 27 of the rocker 28 is in contact with an armature 34 that is attached to the first spring 30, and a second end 29 of the rocker is in contact with the second spring 32. A spring rest 31 is pressed onto a tip of the armature to connect the armature with the first spring. The spring force of the first spring 30 is greater than the spring force of the second spring 32. Accordingly, the first spring 30 drives the armature downward against the force of the second spring 32, and the first end of the rocker seals the NC port 24.

When the valve is energized, the valve moves to the ON position as follows. The armature 34 has a longitudinal axis, the armature being moveable along the longitudinal axis from a first position to a second position. When the armature moves from the first position to the second position, the diaphragm or rocker moves between a first diaphragm position and a second diaphragm position to open and close the valve. In particular, when the valve is energized, the magnetic forces drive the armature 34 upward against the force of the first spring 30, thereby lifting the armature from the first end 27 of rocker 28. With the armature moved out of contact with the rocker, the rocker moves to its second position. In particular, the force of the second spring 32 drives the second end 29 of the rocker downward against the rocker base, thereby sealing the NO port 22. Commensurately, the first end of the rocker moves upward and unseals the NC port 24. Fluid can now flow through the valve from the NC port 24 and out of the common port 26. When the valve is de-energized, the valve returns to the closed position described above, with the rocker in its first position with the NO port open and the NC port sealed, as shown in FIG. 1.

As referenced above, the example of FIG. 1 depicts an exemplary 3-way valve system. The valve also may be configured as a 2-way valve system, in which there is no NO port or the NO port is blocked off. In the closed position, as above the NC port is sealed by the rocker, and thus there is no flow through the valve. When the valve is on, the rocker is in its second position and the common and NC ports are in fluid communication.

The armature 34 extends from the valve portion 12 of the valve 10 into the solenoid actuator portion 14, which includes the components that operate to drive the movement of the armature 34. As further described below, the armature 34 has an ovular transverse cross section. The components of the solenoid actuator portion 14 are enclosed by an outer casing or shell 15. The solenoid actuator portion 14 includes a bobbin 36 that guides the movement of the armature 34 against and away from the rocker 28. As is known in the art, the bobbin 36 has wrapped around it the solenoid coil or windings that drive the movement of the armature 34. As the solenoid coils are energized and then de-energized, the armature 34 moves along a pathway defined by the bobbin 36.

The solenoid actuator portion 14 further includes the additional components that form the complete magnetic circuit, including a flux coupler 38 and a flux bracket 40. The flux coupler 38 receives the bobbin 36, and the flux bracket extends over the flux coupler. When the coil is energized, the solenoid coil or windings of the bobbin generate a magnetic field. The magnetic flux lines of the magnetic field are guided by the flux coupler 38 into the flux bracket 40. The flux bracket 40 includes a pole piece 42 that extends downward toward the armature 34 and within the bobbin 36. Via the pole piece 42, the flux bracket 40 provides a return path of the magnetic flux lines through the flux coupler and back through the armature, thereby completing the magnetic circuit to electromagnetically move the armature. In this manner, the magnetic field generated when the bobbin solenoid coil is energized drives the movement of the armature away from the rocker.

The position of the pole piece 42 determines the stroke length of the armature 34. As seen in the valve OFF position of FIG. 1, an air gap 44 is present between a top end of the armature 34 and the pole piece 42. When the valve is energized, the armature moves away from the rocker until the armature is located against the pole piece. Further movement of the armature is thus restricted by the position of the pole piece, which is thus determinative of the armature stroke length. Accordingly, the pole piece limits the movement of the armature along its longitudinal axis, thereby determining the stroke length of the armature.

The valve operation may be controlled in accordance with a "hit and hold" power control. "Hit and hold" power control achieves high magnetic forces suitable for operating the valve while minimizing the power consumption and avoiding the temperature limits of the solenoid coil. When the valve is in the de-energized state, the air gap 44 between the pole piece 42 and the movable armature 34 is at its largest. The power required to overcome this gap is initially large because of the poor flux carrying properties of the air gap 44. Once movement of the armature has initiated, movement of the armature decreases the air gap, which reduces the negative effect of the air gap on the flux conduction. In turn, the required amount of solenoid coil power reduces as the air gap decreases. Once the air gap is fully closed (the "hit" is achieved), only a relatively small amount of power is required to keep the armature against the pole piece (the "hold" position). Accordingly, the "hit" power is relatively high to increase the magnetic force because the flux through the air gap is not saturated. Once the air gap is gone, only a smaller amount of "hold" power is required because magnetic flux through the materials of the pole piece and armature is saturated. Because the requisite time period during which the "hit" power is needed is brief in duration as compared to the "hold" time period, the overall power consumption of the valve is minimized while still achieving a requisite amount of magnetic force to operate the valve.

The solenoid actuator portion 14 further includes a cover assembly 46 that is secured to the shell 15. As further detailed below, the cover assembly 46 encloses coils pins that are in electrical connection with the solenoid coils of the bobbin. A lead wire 48 extends from the cover assembly 46, which connects the valve to a power source (not shown) for driving the operation of the valve by energizing the bobbin solenoid coil.

Additional details of the components of the valve 10 are described with respect to the additional FIGS. 2-7. In accordance with the various figures, an aspect of the invention is a solenoid valve assembly. In exemplary embodiments, the solenoid valve assembly includes an armature having a longitudinal axis, the armature being moveable along the longitudinal axis from a first position to a second position, and a bobbin including a solenoid coil configured to electromagnetically move the armature along the longitudinal axis from the first position to the second position when energized. The armature has an ovular transverse cross section. The bobbin defines a recess also having ovular cross section for receiving the armature and restricting lateral movement of the armature, thereby providing a linear actuation path for the armature along the longitudinal axis.

Figure 2A:
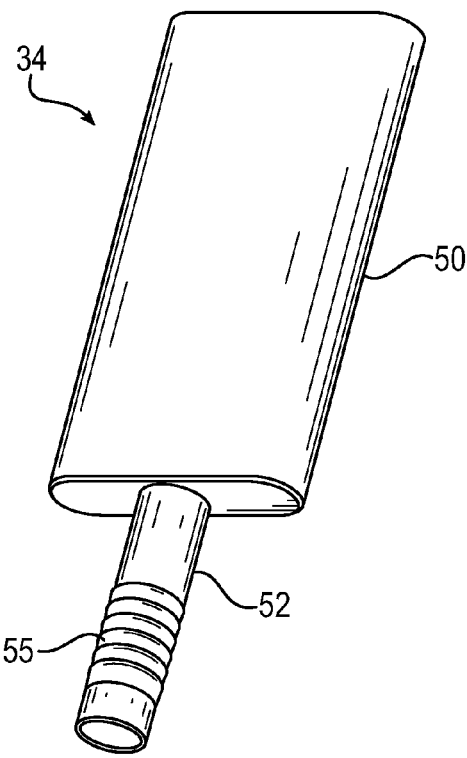
FIGS. 2A and 2B are drawings depicting isometric views from different viewpoints of an exemplary armature for a valve assembly in accordance with embodiments of the present invention.
Figure 2B:
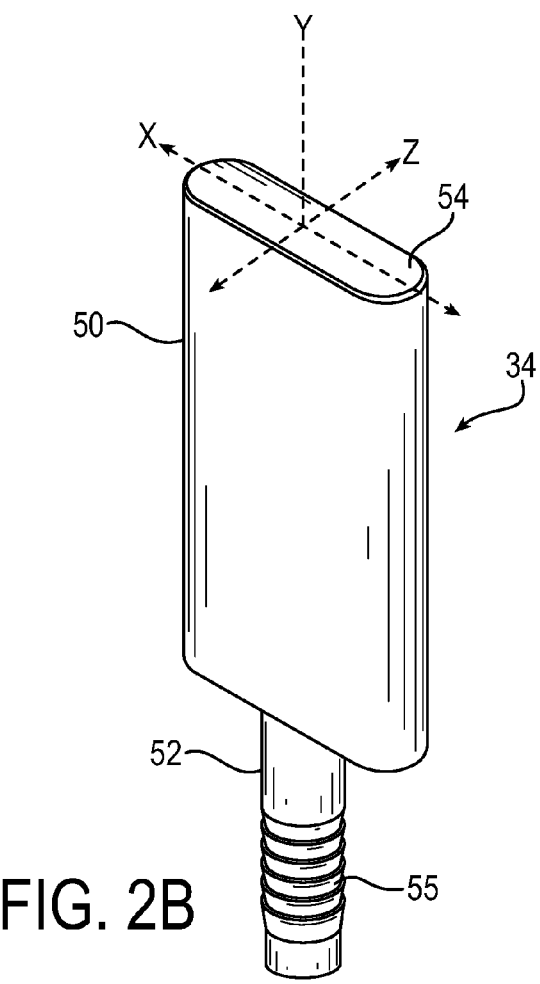

FIGS. 2A and 2B are drawings depicting isometric views from different viewpoints of an exemplary armature 34 in accordance with embodiments of the present invention. The armature 34 includes a body 50 and a tip 52 that extends from the body. The armature is made of a magnetically responsive material, such as iron based metals and alloys as are known in the art. An Fe-50%-Ni material is suitable for use in manufacturing the armature. Referring to FIG. 2B in particular, dimensional axes are indicated relating to the armature 34. The armature 34 includes a longitudinal axis Y, which corresponds to the directional movement of the armature as described with respect to FIG. 1. The armature 34 further includes a transverse axis X and a width axis Z, which are perpendicular to each other and to the longitudinal axis Y.

In exemplary embodiments, the armature body 50 is elongated in the transverse direction into an ovular shaped cross-sectional face 54. The ovular cross-sectional face 54, therefore, is longer than in the transverse X direction than in the width Z direction. In exemplary embodiments, the aspect ratio of the transverse to the width dimensions is greater than 3:1. As exemplary aspect ratio of 3.5:1 has proven to be particularly suitable. In conventional configurations, because of the nature of machining processes, the armature typically has a circular cross section. The ovular shaped armature 34 has more cross-sectional area than a conventional circular shape armature having the same width. The enhanced cross-sectional area enables the armature to carry more flux, and therefore generate higher magnetic attraction forces, as compared to conventional configurations.

Relatedly, the conventional circular cross section is disadvantageous in requiring an increase in overall valve width to achieve comparable performance. As described above, it is desirable to minimize valve width, such as when it is needed to mount multiple valves on a common manifold directly over micro wells. The ovular configuration of the armature described herein reduces overall valve width, while maintaining the requisite valve performance. Because ovular shapes are difficult to machine, metal injection molding is a suitable process for manufacturing the armature 34. As a result, valves for typical diagnostic applications and instruments can be reduced in width to about 9 mm or less, while achieving comparable or better performance as valves with widths of about 16 mm due to the greater cross-sectional area of the ovular shape. The valve of the present invention, therefore, is easier to mount in multiple valve configurations on a common manifold over micro wells without sacrificing performance. The present invention, therefore, is more suitable for use in multiple valve medical dispensers and diagnostic apparatuses, in which high pressures and flows are required.

The armature tip 52 extends from the head 50 into the valve portion 12 as seen in FIG. 1. The tip 52 includes barbs 55 for interfacing with the spring rest 31 that supports the first spring 30, also referenced with respect to FIG. 1. The spring rest 31 may be pressed onto the barbs of the armature tip. The nature of the barbs provides adjustability in the positioning of the spring rest based upon which particular barbs receive the spring rest. Different positions of the first spring 30, based on where the spring rest 31 is pressed onto the barbs 55, provide for different amounts of spring compression. In this manner, the spring compression of the valve is adjustable. In the valve OFF position, the first spring 30, via its interfacing with the armature 34, drive the drives armature 34 downward such that the tip 52 pushes against the rocker 28 to seal the NC port 26. When the valve is energized, the armature 34 moves against the spring force of the first spring 30, and the armature tip 52 moves out of contact with the rocker 28.

Figure 3A:
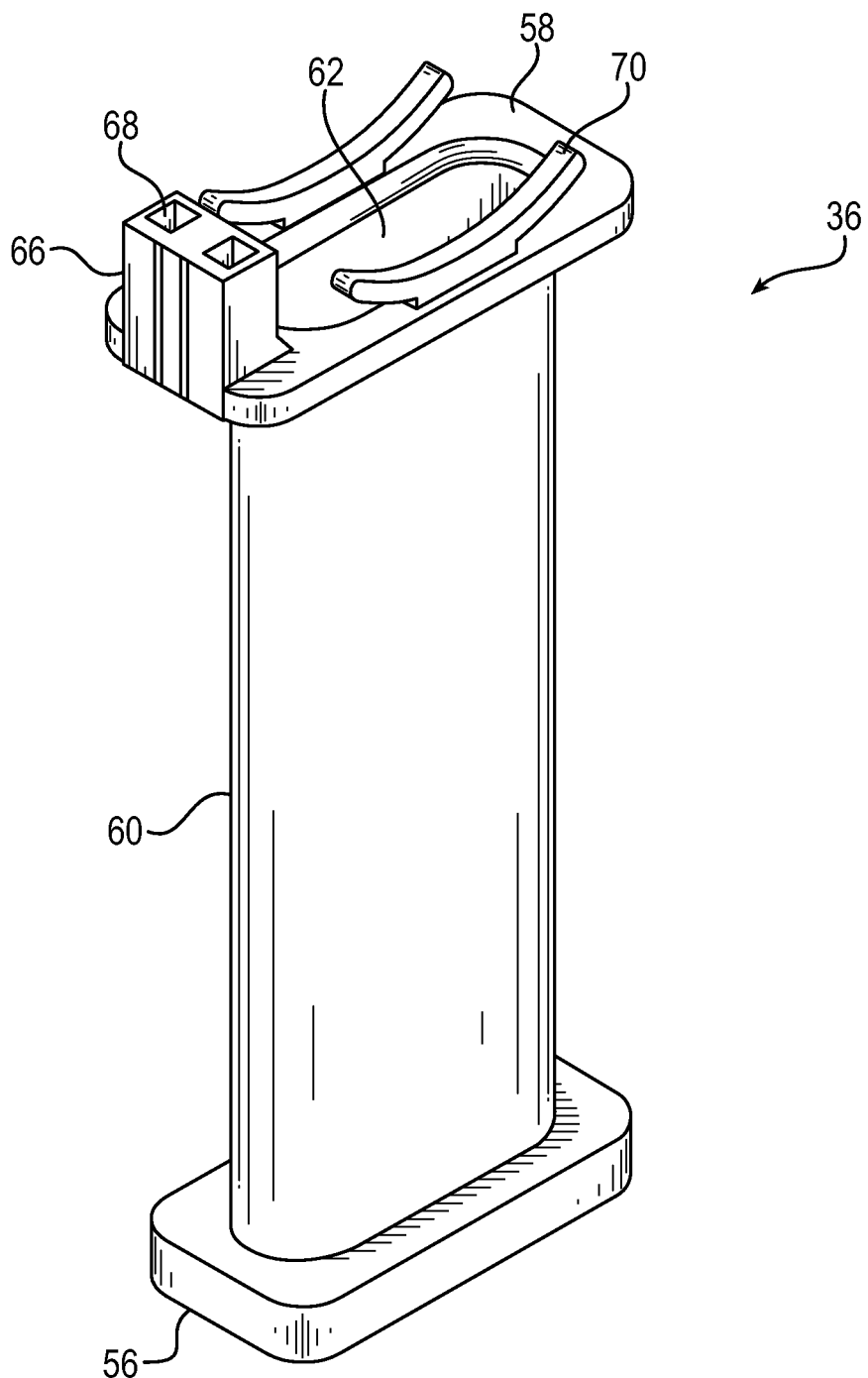
FIG. 3A is a drawing depicting an isometric view of an exemplary bobbin for a valve assembly in accordance with embodiments of the invention.
Figure 3B:
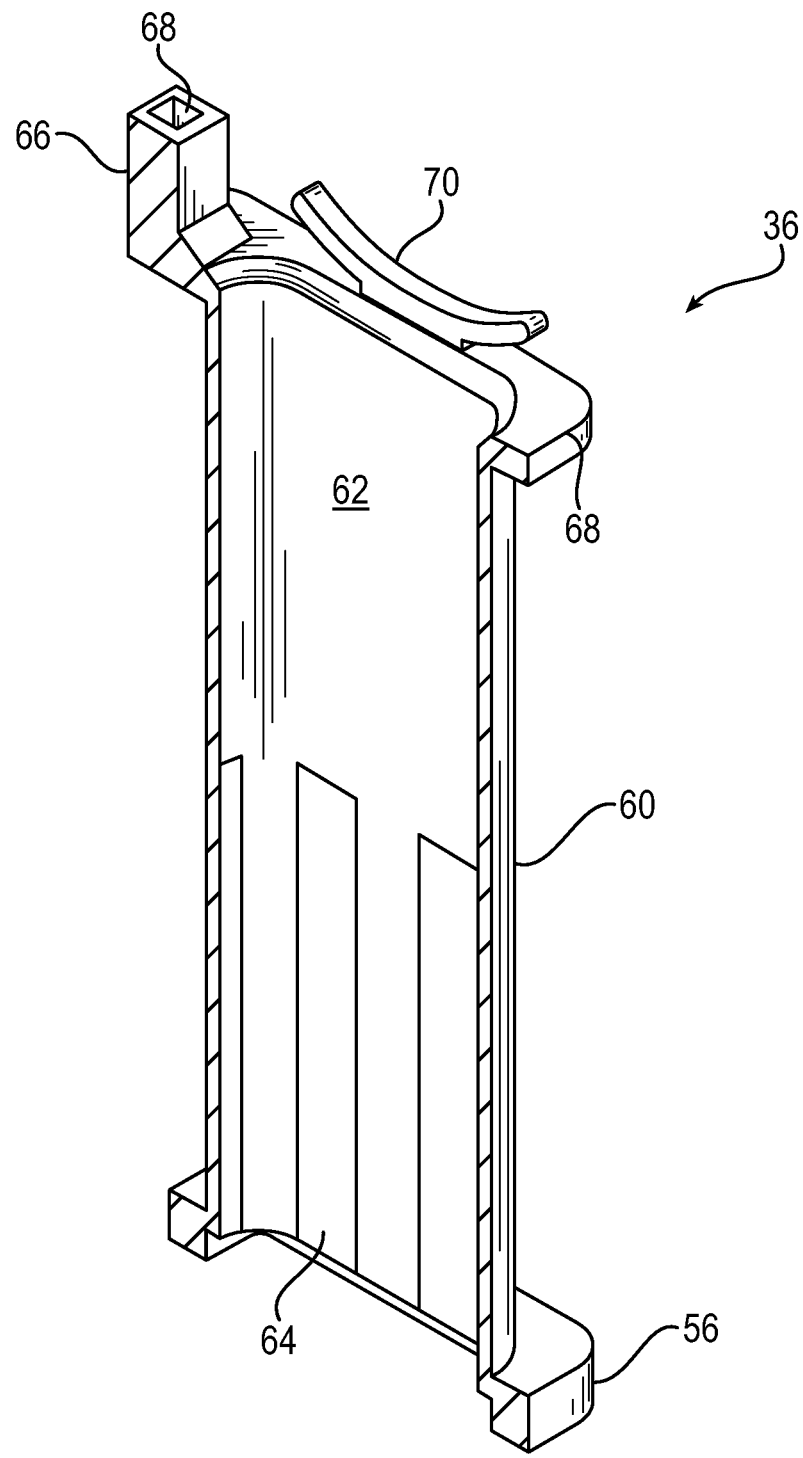
FIG. 3B is a drawing depicting a cross sectional view of the bobbin of FIG. 3A.

FIG. 3A is a drawing depicting an isometric view of an exemplary bobbin 36 in accordance with embodiments of the invention. FIG. 3B is a drawing depicting a cross sectional view of the bobbin 36. The bobbin 36 includes a bobbin base 56, a top 58, and a body 60 that extends between the base and the top. The bobbin defines a recess 62 that extends through the bobbin for moveably receiving the armature 34. Accordingly, the bobbin laterally surrounds the armature and has an ovular cross-section comparable to that of the armature 34. The recess 62 provides a close clearance of the bobbin relative to the armature so as to significantly restrict any lateral movement of the armature, thereby providing a linear actuation path of the armature along its longitudinal axis. As seen in FIG. 1, the recess 62 of the bobbin further encloses the pole piece 42, and the bobbin base 56 is secured to the flux coupler 38.

As seen in the cross-sectional view of FIG. 3B, the bobbin 36 further includes a plurality of internal guiding ribs 64. The guiding ribs 64 may extend from the base 56 upward to a location corresponding to a maximum point of movement of the armature 34. The guiding ribs 64 aid in guiding the armature movement through the bobbin. The guiding ribs also constitute channels for accumulating contaminants and worn material that is shed from the bobbin or armature over use, which otherwise could jam the movement of the armature.

As is known in the art, the bobbin material includes a solenoid coil or windings that wrap around the bobbin, which when energized generates the magnetic field that drives the movement of the armature. The bobbin may be made of a Zytel material including a glass fill. The bobbin may be manufactured by a plastic injection molding process. The top 58 of the bobbin may include an extension 66 having electrical lead inlets 68. The electrical lead inlets provide an electrical connection from the lead wire 48 (see FIG. 1) to the internal solenoid coil of the bobbin.

The top 58 of the bobbin further may include one or more spring clips 70. The spring clips are compressible and provide a spring force that aids in positioning the bobbin within the valve assembly. In particular, the spring clips 70 may be compressed so as to preload the bobbin against the flux coupler 38 to result in a secure positioning of the bobbin within the valve assembly. The spring clips provide for easy assembly without the need for additional fastening components.

Figure 4A:
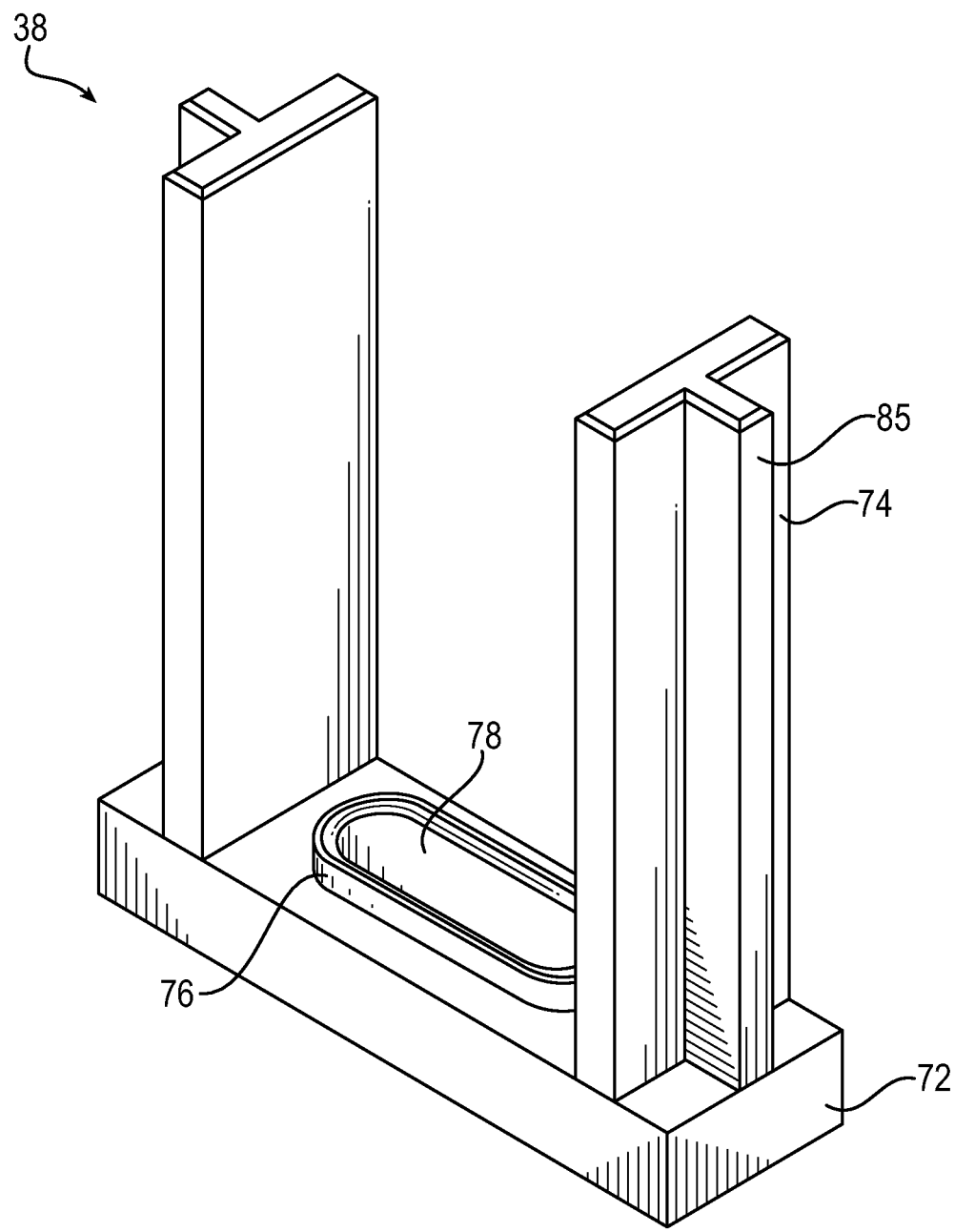
FIGS. 4A and 4B are drawings depicting isometric views from different viewpoints of an exemplary flux coupler for a valve assembly in accordance with embodiments of the present invention.
Figure 4B:
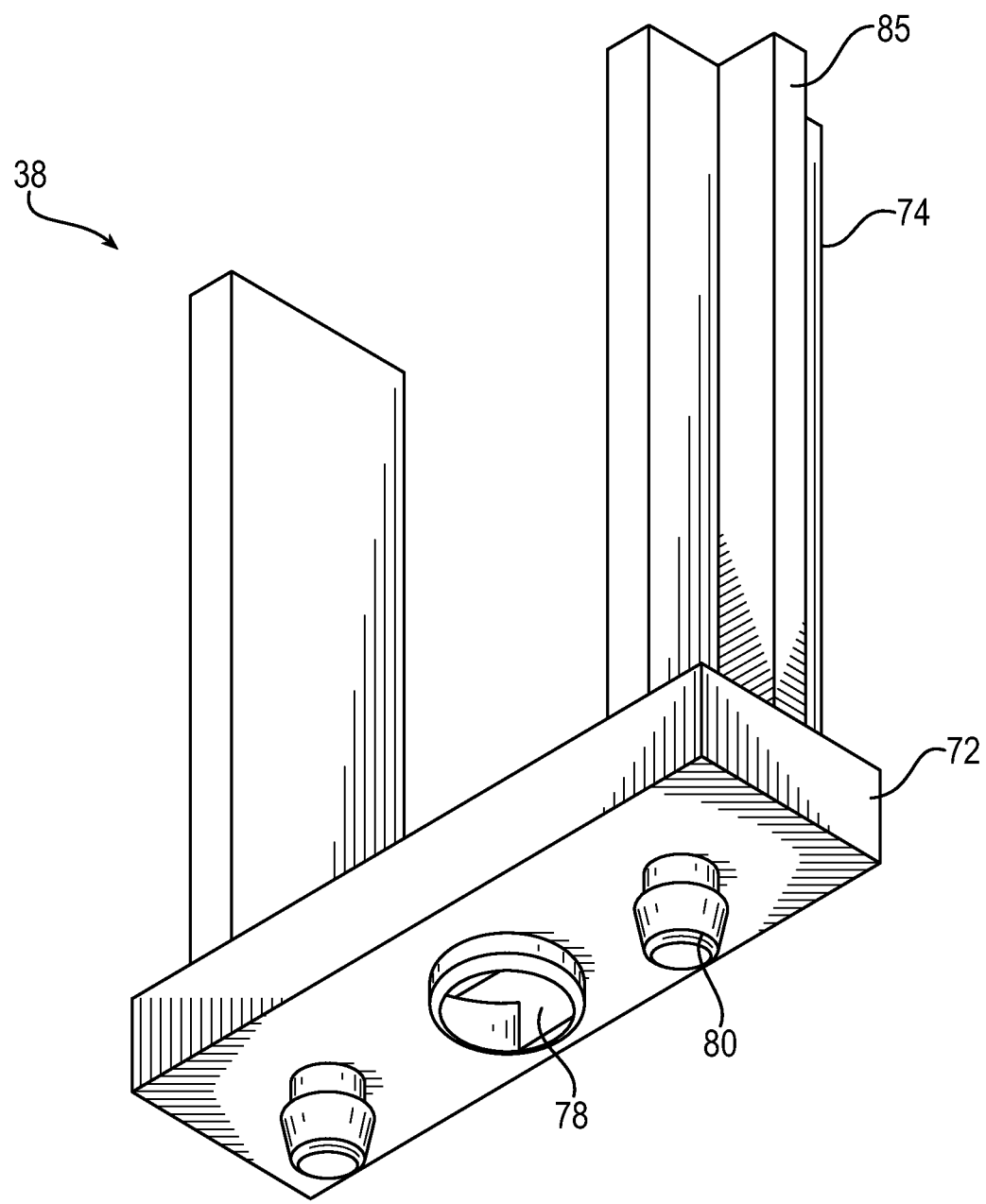
Figure 5A:
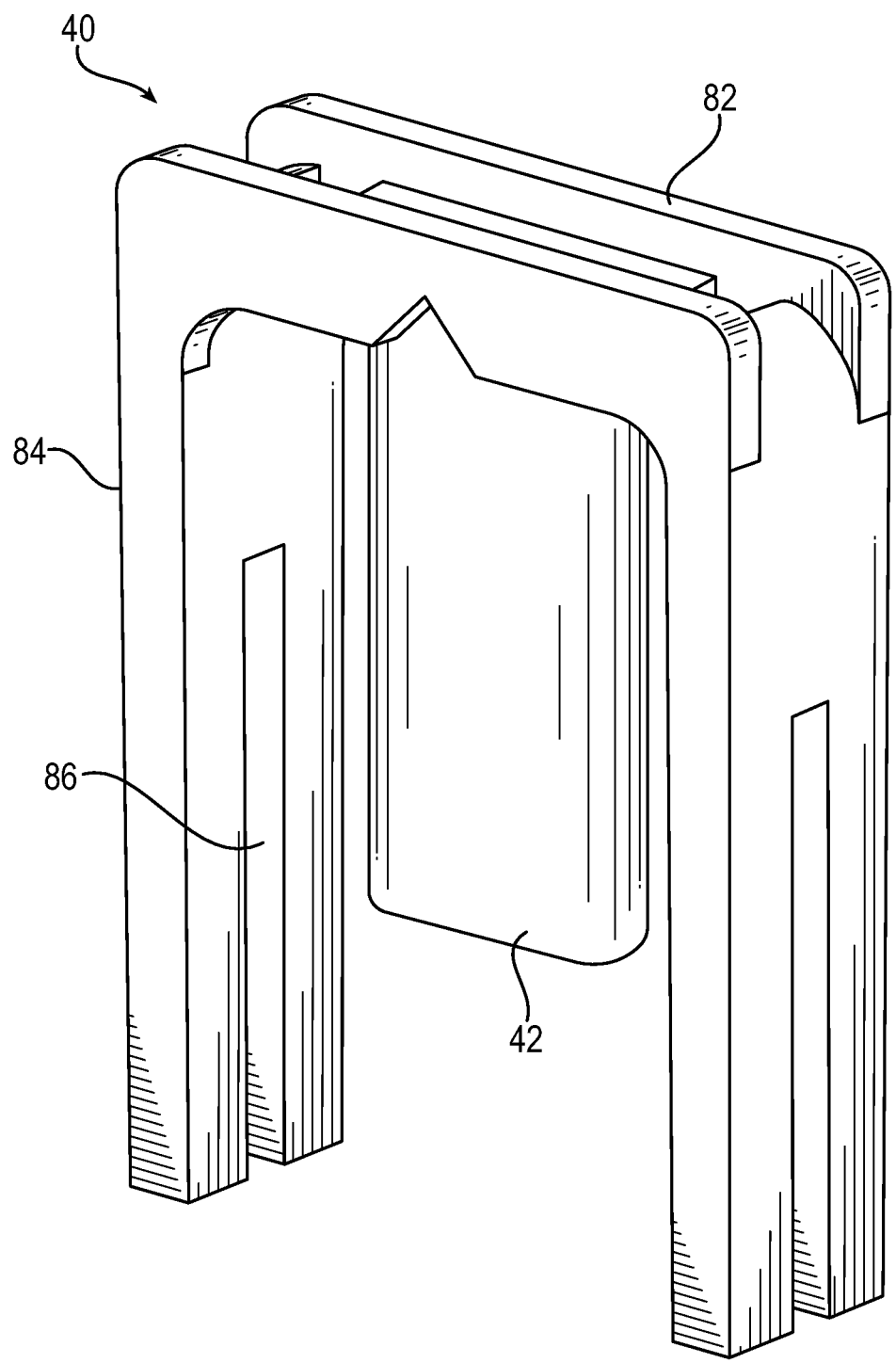
FIGS. 5A and 5B are drawings depicting isometric views from different viewpoints of an exemplary flux bracket for a valve assembly in accordance with embodiments of the present invention.
Figure 5B:
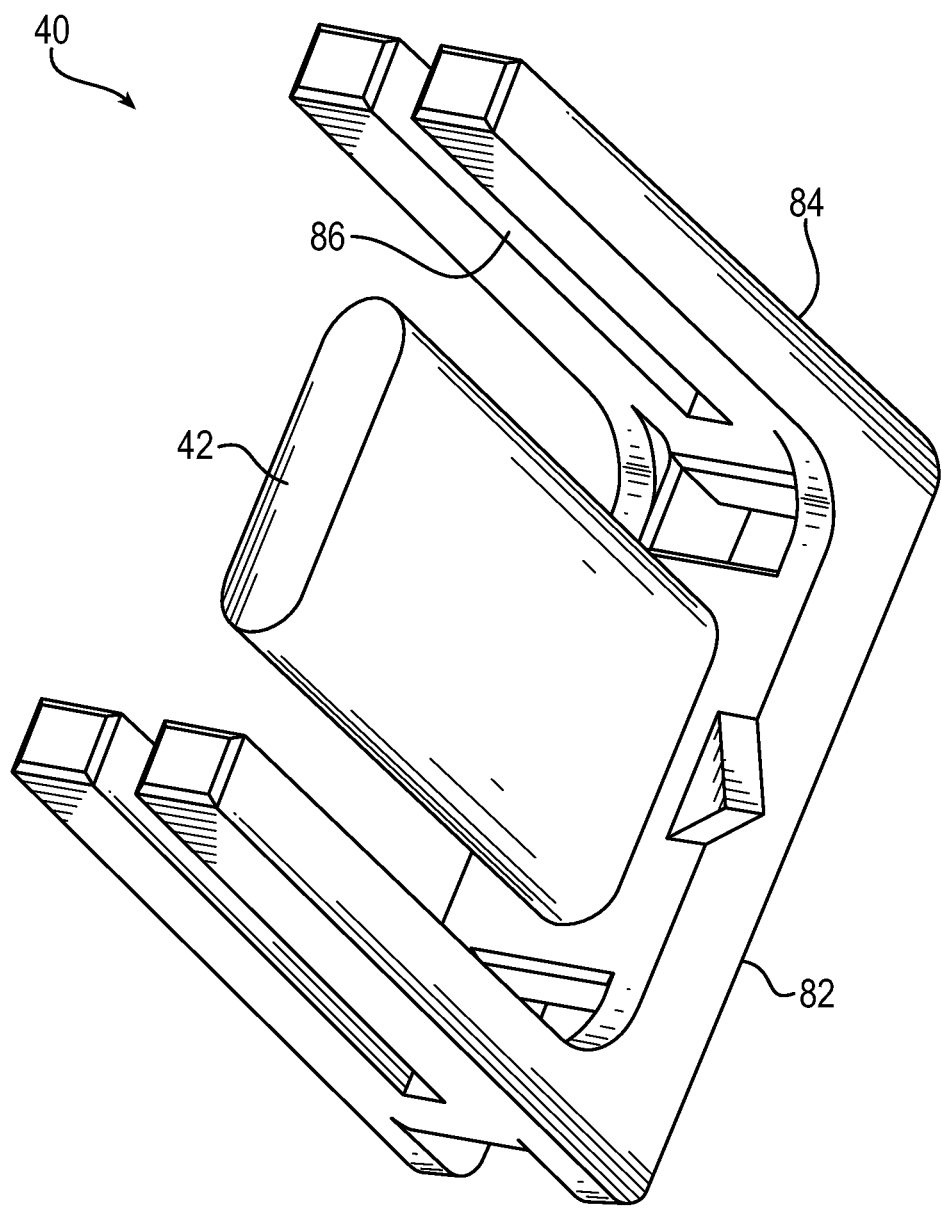

FIGS. 4A and 4B are drawings depicting isometric views from different viewpoints of an exemplary flux coupler 38 in accordance with embodiments of the present invention. FIGS. 5A and 5B are drawings depicting isometric views from different viewpoints of an exemplary flux bracket 40 in accordance with embodiments of the present invention. As referenced above, the flux coupler and flux bracket complete the magnetic circuit with the armature to electromagnetically move the armature. Similarly to the armature, therefore, the flux coupler and flux bracket may be made of a magnetically conductive material, such as iron based metals and alloys as are known in the art. An Fe-50%-Ni material also is suitable for use in manufacturing the flux coupler and flux bracket. The flux coupler and flux bracket also may be manufactured using a metal injection molding process.

The flux coupler 38 may include a coupler base 72 and two coupler sides 74 that extend from the base 72. The coupler base 72 may include a lip 76 that surrounds an opening 78. The ridge and opening are ovular or elliptical in shape comparable as the armature and bobbin. During operation, the armature is moveable within the opening 78. In addition, the ridge 76 acts as guide for positioning the base of the bobbin so as to secure the bobbin within the flux coupler. As seen in the view of FIG. 4B, the bottom of the opening 78 is circular because, as seen in FIG. 1, the armature tip 52 extends through the bottom of the coupler base 72. The coupler base 72 further may include one or more press fit barbs 80 for press fitting the flux coupler into the valve housing 16, as also seen in FIG. 1. The press fit configuration avoids the need for using additional internal fastening elements The flux bracket 40 includes a bracket head 82 and two bracket sides 84 that extend from the bracket head 82. The pole piece 42 referenced previously in connection with FIG. 1 extends downward from a central portion of the bracket head 82. As seen particularly in FIG. 5B, the pole piece has an ovular cross section commensurate with the ovular cross section of the armature.

Because of the design freedom that injection molding allows, the bracket components may be formed as a unitary piece, thus reducing part count and assembly labor as compared to conventional configurations. In conventional circular shaped actuators, a pole piece is separately machined, and then pressed or otherwise attached to a bracket typically made from stamped and formed iron strip metal. The unitary nature of the flux bracket avoids the more complex manufacturing processes of conventional configurations.

The flux coupler and flux bracket may be employed cooperatively to set the stroke length of the armature in a precise manner. As referenced above, the position of the pole piece 42 limits the movement of the armature along its longitudinal axis, thereby determining the stroke length of the armature. The coupler sides 74 of the flux coupler 38 may include side ridges 85, and the bracket sides 84 of the flux bracket 40 may include side slots 86. The side ridges 85 of the flux coupler may be received in the side slots 86 of the flux bracket. It will be appreciated, however, that the side ridges and slots may be reversed, i.e., with the side ridges being provided on the flux bracket and the slots being provided on the flux coupler. During manufacture of the valve, the ridges may be slid within the slots to varying positions, with the location of the pole piece being commensurately adjusted. In this manner, the stroke length of the valve may be set to various lengths depending upon the final positioning of the flux coupler relative to the flux bracket.

The flux bracket is moved to a position where valve performance is optimal. The optimal valve performance corresponds to a minimum stroke length needed to achieve maximum flow through the valve. Once at this position, the flux coupler and flux bracket may be rigidly fixed to each other, such as by welding, which sets the stroke length in essentially a permanent manner.

There is therefore no wasted armature movement, which reduces the solenoid force required to actuate the valve, thus minimizing solenoid size, power and other factors related to achieving solenoid force. In addition, the ability to set the stroke length in a flexible manner with the coupler ridges and bracket slots substantially eliminates the influence of part variation, thereby permitting larger part tolerances. This reduces part costs and improves the consistency of performance.

Figure 6:
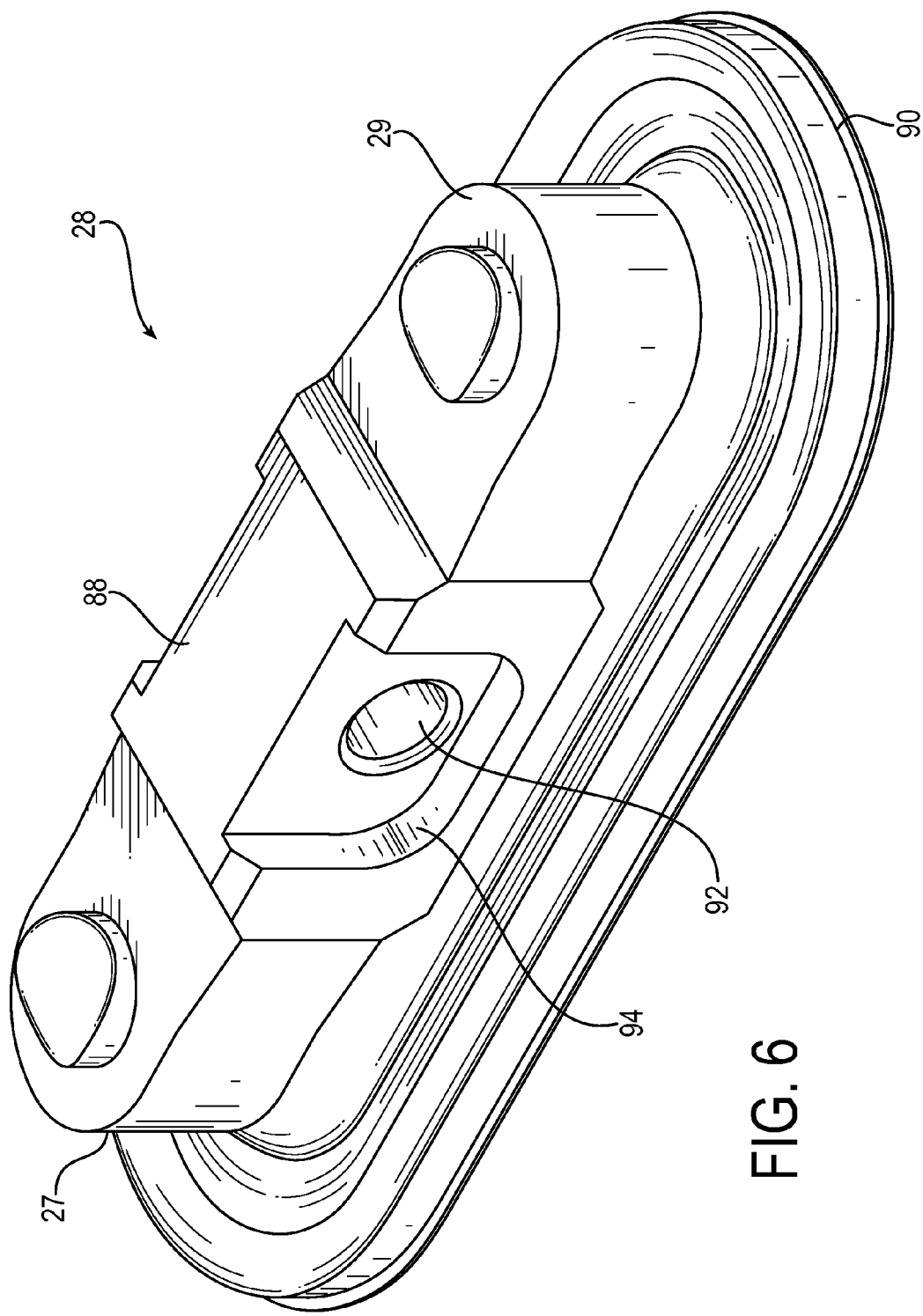
FIG. 6 is a drawing depicting an isometric view of an exemplary rocker diaphragm for a valve assembly in accordance with embodiments of the present invention.

FIG. 6 is a drawing depicting an isometric view of an exemplary valve diaphragm 28, also referred to as the rocker 28, in accordance with embodiments of the present invention. The rocker 28 may include a rocker insert 88 that is over molded with a seal component 90. The rocker insert may be made of any suitable rigid material, including rigid plastic materials. The seal component may be made of a more flexible rubber material that has effective sealing qualities, which may be over molded onto the rocker insert.

As referenced above with respect to FIG. 1, the rocker has a first end 27 where the rocker insert contacts with the armature 34, and a second end 29 where the rocker insert contacts with the second spring 32. As seen in FIG. 6, the rocker insert 88 may be contoured or have surface features to enhance the interaction with the armature and second spring. The rocker also may have a through hole 92 about which the rocker rotates between the first (valve closed or OFF) and second (valve open or ON) positions. The rocker also may have recessed pockets 94 that prevent flash from entering the rocker through hole as the rubber of the seal component is cured during manufacturing.

Figure 7:
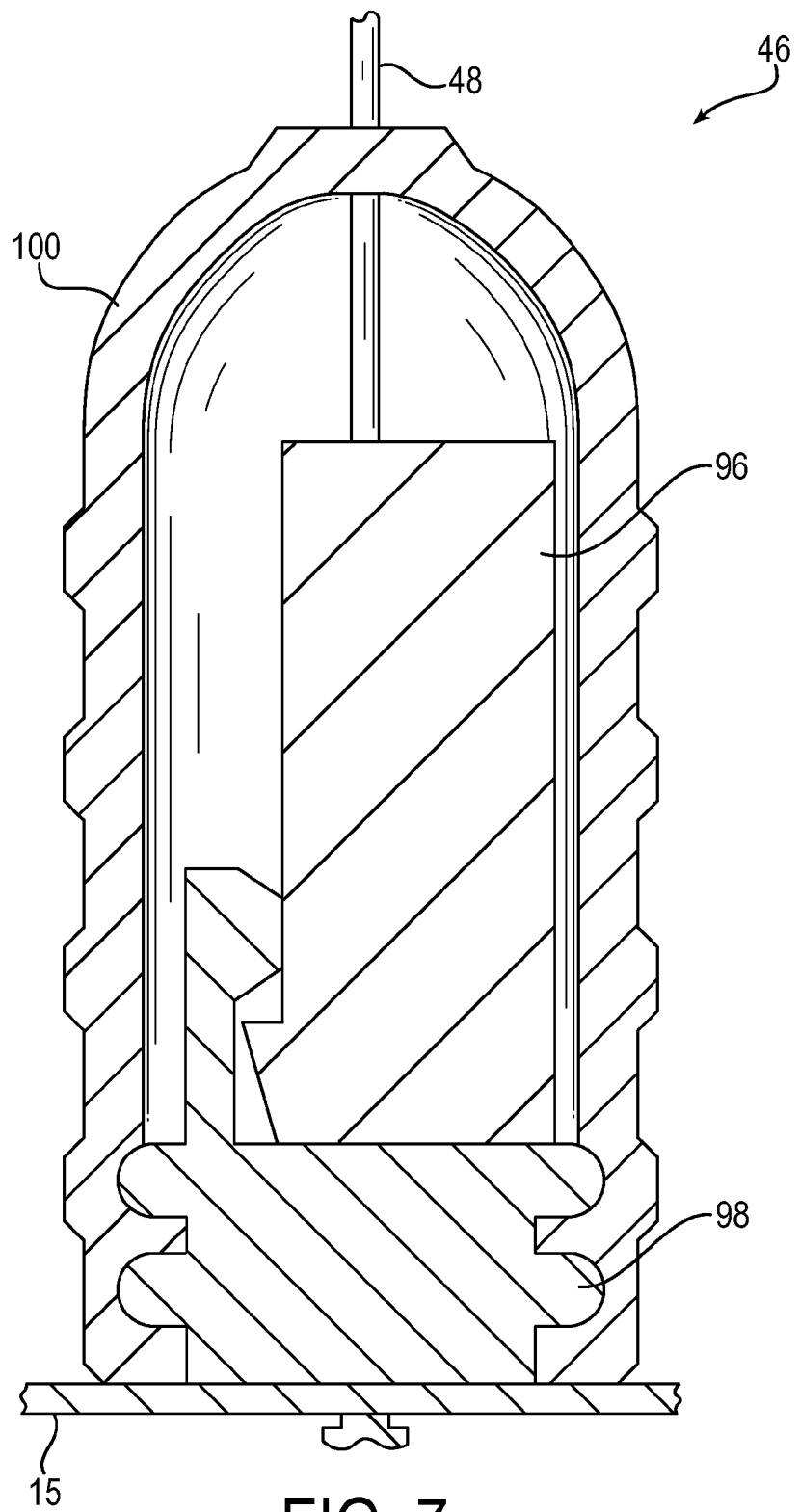
FIG. 7 is a drawing depicting a side cross-sectional view of an exemplary cover assembly for a valve assembly in accordance with embodiments of the present invention.

FIG. 7 is a drawing depicting a side cross-sectional view of an exemplary cover assembly 46 in accordance with embodiments of the present invention. The cover assembly 46 is configured to provide ingress protection for electrical connections that energize the solenoid valve assembly.

Internally, the cover assembly includes a connector 96 that houses coil pins that provide the electrical connections between the lead wire 48 and the solenoid coil within the bobbin 36. With reference also to FIG. 1, the outer shell 15 has a connector post 98 that extends upward from the shell 15. The cover assembly 46 may include a connector cover 100 that is fitted over the connector post. The connector cover 100 may be configured as a rubber boot that flexibly stretch fits over the connector post to provide a sealed fit. In this manner, ingress protection from liquid and solid contaminants is provided for the internal electrical components of the connector 96. The ingress protection is particularly effective against liquid contamination that may result from splashes of fluid materials handled in connection with diagnostics process common in a medical environment.

An aspect of the invention, therefore, is a solenoid valve assembly. In exemplary embodiments, the solenoid valve assembly includes an armature having a longitudinal axis, the armature being moveable along the longitudinal axis from a first position to a second position, and a bobbin including a solenoid coil configured to electromagnetically move the armature along the longitudinal axis from the first position to the second position when energized. The armature has an ovular transverse cross section.

In an exemplary embodiment of the solenoid valve assembly, the ovular transverse cross section of the armature has an aspect ratio of greater than 3:1.

In an exemplary embodiment of the solenoid valve assembly, the bobbin defines a recess having an ovular cross section for receiving the armature and restricting lateral movement of the armature, thereby providing a linear actuation path for the armature along the longitudinal axis.

In an exemplary embodiment of the solenoid valve assembly, the recess of the bobbin includes a plurality guiding ribs configured to provide an area for shed material to accumulate away from the armature.

In an exemplary embodiment of the solenoid valve assembly, the bobbin includes one or more spring clips that are preloaded to secure positioning of the bobbin within the solenoid valve assembly.

In an exemplary embodiment of the solenoid valve assembly, the solenoid valve assembly further includes a flux coupler and a flux bracket, wherein a magnetic circuit to electromagnetically move the armature comprises the flux coupler, the flux bracket, and the armature.

In an exemplary embodiment of the solenoid valve assembly, the flux bracket has a pole piece that limits the movement of the armature along the longitudinal axis, thereby determining a stroke length of the armature.

In an exemplary embodiment of the solenoid valve assembly, the pole piece has an ovular cross section commensurate with the ovular cross section of the armature.

In an exemplary embodiment of the solenoid valve assembly, one of the flux coupler or flux bracket includes a plurality of ridges and the other includes a plurality of slots, wherein the flux coupler and flux bracket are slidably moveable relative to each other to adjust the position of the pole piece.

In an exemplary embodiment of the solenoid valve assembly, the solenoid valve assembly further includes a diaphragm, wherein when the armature moves from the first position to the second position, the diaphragm moves between a first diaphragm position and a second diaphragm position.

In an exemplary embodiment of the solenoid valve assembly, the solenoid valve assembly further includes a first spring and a second spring. When the armature is in the first position, the first spring biases the armature against the diaphragm to render the solenoid valve assembly in an OFF position, and when the valve assembly is energized and the armature is in the second position, the second spring moves the diaphragm to render the solenoid valve assembly in an ON position.

In an exemplary embodiment of the solenoid valve assembly, the diaphragm is a rocker comprising a rocker insert that is over molded with a seal component.

In an exemplary embodiment of the solenoid valve assembly, the rocker rocks about a through hole, and the rocker has recess pockets that prevent rubber flash from entering the through hole.

In an exemplary embodiment of the solenoid valve assembly, the solenoid valve assembly further includes a normally open port, a normally closed port, and a common port. In the first diaphragm position, the seal component seals the normally closed port and the normally open port is open, and in the second diaphragm position, the seal component seals the normally open port and the normally closed port is open. In the second diaphragm position, the normally closed port and the common port are in fluid communication to permit a flow of a fluid through the valve assembly.

In an exemplary embodiment of the solenoid valve assembly, the solenoid valve assembly further includes a spring rest that receives the first spring, wherein the armature has barbs into which the spring rest is pressed, and the position of the spring rest is adjustable based upon where the spring rest is pressed into the barbs of the armature.

In an exemplary embodiment of the solenoid valve assembly, the solenoid valve assembly further includes a cover assembly configured to provide ingress protection for electrical connections that energize the solenoid valve assembly, wherein the cover assembly comprises a connector that houses the electrical connections and a rubber boot that fits over the connector.

In an exemplary embodiment of the solenoid valve assembly, the solenoid valve assembly has a width in a direction perpendicular to the longitudinal axis of 9 mm or less.

In an exemplary embodiment of the solenoid valve assembly, the solenoid valve assembly further includes a plurality of alignment pins that provide for proper alignment of valve ports with cooperating ports on a manifold.

Another aspect of the invention is a method of setting a stroke length of a solenoid actuator valve assembly. In exemplary embodiments, the method includes the steps of displacing a pole piece of the valve assembly sufficient to achieve optimal valve performance, the optimal valve performance corresponding to a minimum stroke length needed to achieve maximum flow through the valve, and fixing a position of the pole piece within the valve assembly In an exemplary embodiment of the method of setting a stroke length, the solenoid actuator valve assembly has a flux coupler and a flux bracket including the pole piece, and the pole piece is displaced by moving the flux bracket relative to the flux coupler.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A solenoid valve assembly comprising:
    an armature having a longitudinal axis, the armature being moveable along the longitudinal axis from a first position to a second position; and
    a bobbin including a solenoid coil configured to electromagnetically move the armature along the longitudinal axis from the first position to the second position when energized;
    wherein the armature has an ovular transverse cross section;
    the solenoid valve assembly further comprising a flux coupler and a flux bracket, wherein a magnetic circuit to electromagnetically move the armature comprises the flux coupler, the flux bracket, and the armature;
    wherein the flux bracket has a pole piece that limits the movement of the armature along the longitudinal axis, thereby determining a stroke length of the armature; and
    wherein one of the flux coupler or flux bracket includes a plurality of ridges and the other includes a plurality of slots, wherein the flux coupler and flux bracket are slidably moveable relative to each other to adjust the position of the pole piece.

2. The solenoid valve assembly of claim 1, wherein the ovular transverse cross section of the armature has an aspect ratio of greater than 3:1.

3. The solenoid valve assembly of claim 1, wherein the bobbin includes one or more spring clips that are preloaded to secure positioning of the bobbin within the solenoid valve assembly.

4. The solenoid valve assembly of claim 1, wherein the pole piece has an ovular cross section commensurate with the ovular cross section of the armature.

5. The solenoid valve assembly of claim 1, further comprising a cover assembly configured to provide ingress protection for electrical connections that energize the solenoid valve assembly, wherein the cover assembly comprises a connector that houses the electrical connections and a rubber boot that fits over the connector.

6. The solenoid valve assembly of claim 1, wherein the solenoid valve assembly has a width in a direction perpendicular to the longitudinal axis of 9 mm or less.

7. The solenoid valve assembly of claim 1, further comprising a plurality of alignment pins that provide for proper alignment of valve ports with cooperating ports on a manifold.

8. The solenoid valve assembly of claim 1, wherein the bobbin defines a recess having an ovular cross section for receiving the armature and restricting lateral movement of the armature, thereby providing a linear actuation path for the armature along the longitudinal axis.

9. The solenoid valve assembly of claim 8, wherein the recess of the bobbin includes a plurality guiding ribs configured to provide an area for shed material to accumulate away from the armature.

10. The solenoid valve assembly of claim 1, further comprising a diaphragm, wherein when the armature moves from the first position to the second position, the diaphragm moves between a first diaphragm position and a second diaphragm position.

11. The solenoid valve assembly of claim 10, further comprising a first spring and a second spring;
wherein when the armature is in the first position, the first spring biases the armature against the diaphragm to render the solenoid valve assembly in an OFF position, and when the valve assembly is energized and the armature is in the second position, the second spring moves the diaphragm to render the solenoid valve assembly in an ON position.

12. The solenoid valve assembly of claim 11, further comprising a spring rest that receives the first spring, wherein the armature has barbs into which the spring rest is pressed, and the position of the spring rest is adjustable based upon where the spring rest is pressed into the barbs of the armature.

13. The solenoid valve assembly of claim 10, wherein the diaphragm is a rocker comprising a rocker insert that is over molded with a seal component.

14. The solenoid valve assembly of claim 13, the rocker rocks about a through hole, and the rocker has recess pockets that prevent rubber flash from entering the through hole.

15. The solenoid valve assembly of claim 13, further comprising a normally open port, a normally closed port, and a common port;
wherein in the first diaphragm position, the seal component seals the normally closed port and the normally open port is open, and in the second diaphragm position, the seal component seals the normally open port and the normally closed port is open; and,
in the second diaphragm position, the normally closed port and the common port are in fluid communication to permit a flow of a fluid through the valve assembly.

16. A method of setting a stroke length of a solenoid actuator valve assembly comprising the steps of:
displacing a pole piece of the valve assembly sufficient to achieve optimal valve performance, the optimal valve performance corresponding to a minimum stroke length needed to achieve maximum flow through the valve; and
fixing a position of the pole piece within the valve assembly;
wherein the solenoid actuator valve assembly has a flux coupler and a flux bracket including the pole piece, and one of the flux coupler or flux bracket includes a plurality of ridges and the other includes a plurality of slots,
the setting method further comprising slidably moving the flux coupler and flux bracket relative to each other via the ridges and slots to set the position of the pole piece at which the pole piece is fixed within the valve assembly.

* * * * *